(12) United States Patent
Green et al.

(10) Patent No.: US 6,398,849 B1
(45) Date of Patent: Jun. 4, 2002

(54) PROCESS AND APPARATUS FOR TREATING GASEOUS PRODUCTS OF SOL-GEL MANUFACTURING

(75) Inventors: Lisa Carol Green, Alpharetta, GA (US); David A Mixon, Port Murray; Eric M Monberg, Princeton, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/566,850

(22) Filed: May 8, 2000

Related U.S. Application Data

(60) Provisional application No. 60/157,279, filed on Oct. 1, 1999.

(51) Int. Cl.[7] .............................................. B01D 47/14
(52) U.S. Cl. ............................. 95/187; 95/211; 95/227; 96/262; 96/290
(58) Field of Search .......................... 95/149, 167, 210, 95/211, 227; 96/243, 226, 290, 270, 273, 277, 280, 322

(56) References Cited

U.S. PATENT DOCUMENTS

| | | | |
|---|---|---|---|
| 3,704,570 A | * | 12/1972 | Gardenier |
| 4,217,027 A | | 8/1980 | MacChesney et al. |
| 4,262,035 A | | 4/1981 | Jaeger et al. |
| 4,775,401 A | | 10/1988 | Fleming et al. |
| 5,240,488 A | | 8/1993 | Chandross et al. |
| 5,951,743 A | * | 9/1999 | Hsieh et al. |
| 6,019,816 A | * | 2/2000 | Lim |

OTHER PUBLICATIONS

*Chemical Engineers Handbook,* Perry and Chilton, ed., 5th Ed., McGraw–Hill, p. 14–2 (1973).
F. DiMarcello et al., "Fiber Drawing and Strength Properties," *Optical Fiber Communications,* vol. 1, Academic Press, Inc., pp. 179–248 (1985).

* cited by examiner

*Primary Examiner*—Duane S. Smith
(74) *Attorney, Agent, or Firm*—Scott Rittman

(57) ABSTRACT

A process deals with gaseous by-products and tarry materials during formation of sol-gel bodies. Gaseous products from a dehydroxylation reactor pass into a gas-fluid contactor. During the early stages of heat treatment, an aqueous acid solution is recirculated through the contactor to trap basic and/or water soluble organic gaseous materials. The resultant solution and non-condensing gases pass into a reservoir. Volatile, undissolved organics exit from the reservoir with non-condensing reactor gases and are treated. Once the organics have burned out of the sol-gel body, recirculation of the aqueous acid solution is ceased, and the gas-fluid contactor is flushed. The water flow is then ceased and dry nitrogen is provided to the contactor. During the next stage of the sol-gel heat treatment, gaseous products from the dehydroxylation reactor pass through the contactor into the caustic scrubber. Once the heat treatment is complete, the contactor is flushed.

18 Claims, 2 Drawing Sheets

PROCESS AND APPARATUS FOR TREATING GASEOUS PRODUCTS OF SOL-GEL MANUFACTURING

CROSS-REFERENCE TO RELATED APPLICATION

This application claims priority of Provisional Application Ser. No. 60/157,279 which was filed Oct. 1, 1999.

BACKGROUND OF THE INVENTION

1. Field of the Invention

The invention relates to treating by-products of manufacturing processes, in particular, the treatment of the gaseous products generated during the formation of sol-gel bodies.

2. Discussion of the Related Art

Glass optical fiber is typically drawn from a solid preform containing an overcladding that surrounds an inner cladding and core. An overcladding tube is generally formed separately from the inner cladding and core, and the components are then brought together to make the preform. The overcladding does not have to meet purity and uniformity specifications as high as the core and inner cladding, and some efforts at improving manufacturing efficiency and lowering cost of optical fiber manufacturing processes have therefore focused on the overcladding. These efforts have led to the use of sol-gel processes to form overcladding tubes.

U.S. Pat. No. 5,240,488, the disclosure of which is hereby incorporated by reference, discloses a sol-gel process for production of overcladding tubes. In the process, an aqueous colloidal silica dispersion is used. The dispersion is typically stabilized by addition of a base such as tetramethylammonium hydroxide (TMAH). It is also possible to use other tetraalkylammonium hydroxides. TMAH is believed to stabilize silica particles by the following mechanism: Introduction of the TMAH solution into a silica dispersion raises the pH value. The silica then takes on a negative surface charge due to ionization of silanol groups present on the surface. The negative charge on the silica particles creates mutual repulsion, preventing substantial agglomeration and maintaining the stability of the dispersion. At later stages in the process, as discussed at Cols. 14–15 and shown in the Table at Cols. 11 and 12 of the '488 patent, a polymer (e.g., polyethyloxazoline) is added, a low molecular weight surface modifier (e.g., glycerin) is added, and then a gelling agent (e.g., methyl formate) is added. The gelling agent, through reaction with water and/or base, neutralizes the negatively-charged silica to a degree where gelation is induced.

Subsequent to gelation, bulk water is removed from the sol-gel bodies in a dryer system, and then the bodies placed in a dehydroxylation reactor, within a furnace, for heat treatment. The heat treatment is typically performed in steps which (a) remove remaining interstitial water, (b) remove organic materials, (c) dehydroxylate the sol-gel bodies, and (d) remove metal and oxide impurities. Chlorine-containing gases are often used in such heat treatment both for dehydroxylation and metal impurity removal, as reflected in the '488 patent.

While processes such as that of the '488 patent produce good results, the removal of these various impurities from the sol-gel bodies is often problematic. For example, one of the volatile organics generated during heat treatment is trimethyl amine (TRIMA), which exhibits some undesirable properties such as strong odor. The TRIMA therefore generally cannot be released into the environment, but is instead burned in a thermal oxidizer or trapped in a solution and subsequently removed. Other gaseous organic products, as well as the chlorine-containing gases used during the heat treatment, similarly are not able to be released directly into the environment, and liquid residues of organic materials and transition metal impurities must also be disposed in a safe manner.

Apparatus must therefore be designed to trap and treat a variety of gaseous materials resulting from heat treatment of the sol-gel bodies. However, some of the gaseous by-products of the heat treatment tend to condense subsequent to exiting the high temperatures of a dehydroxylation reactor, thereby clogging and damaging the equipment. Other materials, particularly chlorine and thionyl chloride, lead to severe corrosion of metals in the presence of water. Thus, the process and apparatus for treating the numerous gaseous products of a sol-gel heat treatment must be designed to handle a variety of materials, some of which require mutually exclusive treatment conditions. A relatively simple, straightforward design is desired, particular a design suitable for commercial applications.

SUMMARY OF THE INVENTION

The invention relates to a process and apparatus for dealing with the variety of gaseous products generated during the formation, specifically the heat-treatment, of bodies such as sol-gel bodies, as well as dealing with the variety of materials that tend to condense on, and clog, conventional equipment. In a process for fabricating sol-gel articles, as illustrated by the apparatus of FIG. 1, gaseous products from a dehydroxylation reactor 10 pass into a gas-fluid contactor 18 through an entrance tube 14, the entrance tube typically heated to at least 150° C., more typically at least 325° C. (Gas-fluid contactors are known in the art, as discussed in the *Chemical Engineers Handbook*, Perry and Chilton, ed., 5th Ed., McGraw-Hill, 1973, at 14-2. Such contactors are also known to be used as waste gas scrubbers (see, e.g., Hawley's Condensed Chemical Dictionary, 12th Ed.)). Heating the entrance tube inhibits condensation of gaseous materials, which would otherwise clog the tube and hinder the process. During the early stages of heat treatment, when TRIMA and other volatile organics are emitted from the dehydroxylation reactor 10, an aqueous acid solution from reservoir 20 is circulated through the contactor 18. The aqueous acid solution traps the basic and/or water soluble organic gaseous materials, and the resultant solution and non-condensing gases pass into the reservoir 20. Specifically, the aqueous acid solution forms a non-volatile salt with the TRIMA, e.g.,

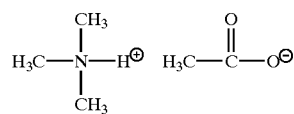

is formed from TRIMA and acetic acid. The reservoir solution, containing aqueous acid as well as organic salts and other dissolved, water-soluble organics, is recirculated through the gas-fluid contactor to continue trapping the gaseous products, with additional aqueous acid solution provided to the reservoir as needed. Volatile, undissolved organics exit with the non-condensing reactor gases and are treated by standard methods, e.g., thermal oxidation or carbon bed adsorption.

Once the organics have been substantially burned out of the sol-gel body, recirculation of the aqueous acid solution is ceased, and the gas-fluid contactor is flushed, typically with water, to wash remaining organic residue from the contactor. The water flow is then ceased and dry nitrogen is flushed through to the contactor. The dry nitrogen enters the contactor through valves 3 and 5, and mixes with the hot gases exiting the reactor. The combined gas stream then flows through valves 1 and 6 into the reservoir and then on to the thermal oxidizer or carbon beds. This gas flow completely dries the interior of the contactor and its associated valves—otherwise the remaining water, in combination with subsequent chlorine-containing gases from the dehydroxylation reactor, will tend to cause severe corrosion of the equipment. During the next stage of the sol-gel heat treatment, in which such chlorine-containing gases are commonly used, valve 1 is closed, valve 2 is opened, and the gaseous products from the dehydroxylation reactor pass through the contactor into the caustic scrubber. (Certain by-products are condensed within the contactor as solids, e.g., metal chlorides and thermal decomposition products of thionyl chloride.) The dry nitrogen flow is typically continued throughout this stage and for the remainder of the sol-gel body's heat treatment. The nitrogen flow prevents back-streaming of water vapor from the caustic scrubber and also cools the contactor and the gases exiting the reactor such that condensable metal salts are largely kept in the contactor. Once the heat treatment is complete, valve 2 to the caustic scrubber is closed, valves 1 and 6 are opened to a holding tank 22, and the contactor is flushed, typically with water, to wash the water soluble salts, including metal salts and chlorides, into the holding tank. The whole process is then repeated for a subsequent set of sol-gel bodies.

The invention thus provides a relatively simple and commercially viable way to deal with the variety of gaseous products generated by a sol-gel fabrication process.

DETAILED DESCRIPTION OF THE INVENTION

Figure 1:
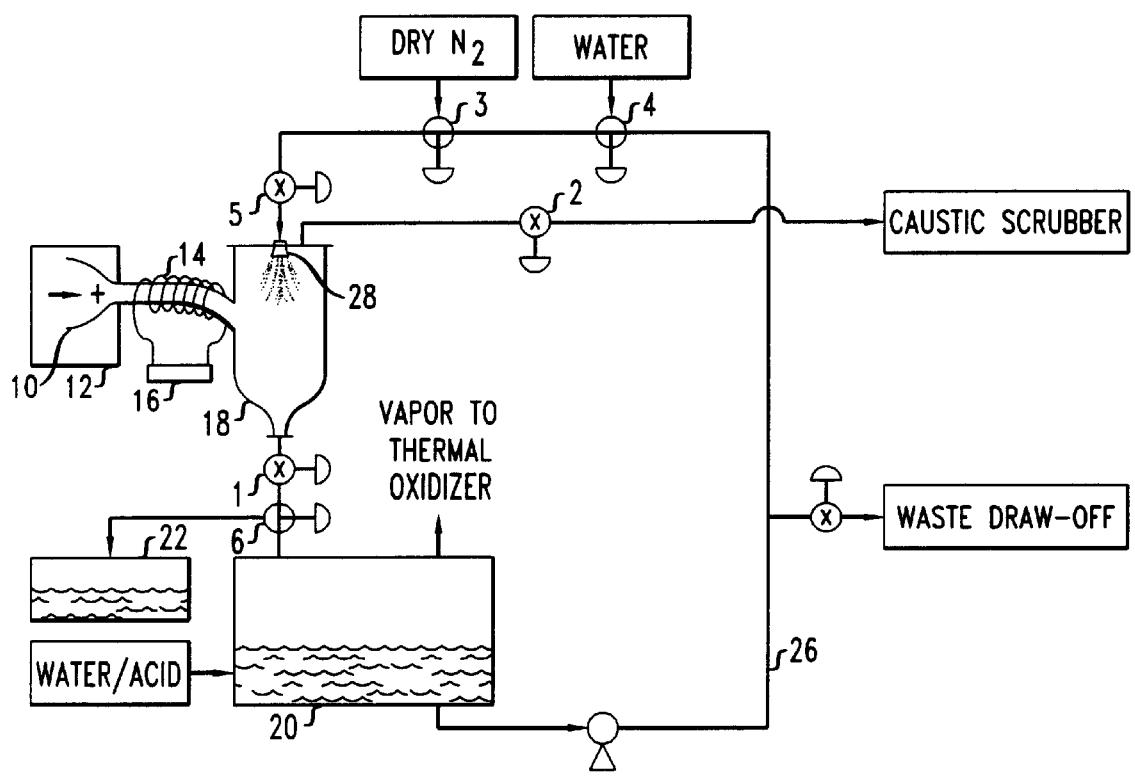
FIG. 1 is a schematic illustration of an apparatus suitable for practicing the invention.

During the initial stages of a sol-gel body heat treatment, volatile organic materials are generated and released from the bodies. These organic materials include TRIMA, carbon monoxide, and methanol (which are generated from the thermal decomposition of tetramethylammonium formate), additional CO and $CO_2$ resulting from the combustion of organics with oxygen-containing gases, and so-called higher molecular weight organics (HMWO), which are generated from oxidation of polymers added to the sol. According to an embodiment of the invention, reflected in FIG. 1, these gaseous materials pass from a dehydroxylation reactor 10 containing the sol-gel bodies into a gas-fluid contactor 18. The gas-fluid contactor provides a region of space within which the effluents from the sol-gel heat treatment are able to be mixed with another fluid—either liquid or gaseous—in order to effect the separation of by-products of sol-gel heat treatments from non-condensing reactants and carrier gases used in the process. The separation of by-products can occur by the mechanism of physical or chemically-assisted absorption into a liquid, or by cooling and subsequent condensation. In particular, it is possible for the region above and below the entrance tube 14 to be filled with packing, e.g., Raschig rings, to increase the contact area for these processes to occur.

Some of the gaseous materials exiting the reactor 10, particularly the HMWO, have low volatility and therefore tend to condense upon exiting the high temperature dehydroxylation reactor 10. To prevent such condensation, which would clog the entrance tube 14, the tube 14 is heated (with a heater 16), typically to at least 150° C., advantageously 325 to 350° C. It is possible for the heater to be a small enclosed furnace, or, advantageously, to be resistive heating wire wrapped around the tubing. The outlet tube from the reactor 10 is generally quartz and typically ends in a ball or socket joint, which connects to a quartz ball or socket joint attached to the gas-fluid contactor 18. This connection assembly then connects the reactor and the contactor. Advantageously, the connection is a ball and socket coupling, e.g., two ball and socket joints attached to opposing ends of a short length of tubing, which form a universal joint connection between reactor 10 and contactor 18.

It is possible for the gas-fluid contactor 18 to be any conventional contactor. The contactor 18 of FIG. 1 is a referred to as a spray condenser, due to use of a spray nozzle 28 for introducing liquid and gases into the interior of the contactor 18. Gas-fluid contactors used in the invention are advantageously formed from quartz, which endures thermal shock without breakage and also exhibits desirable corrosion resistance. It is also possible to use other corrosion resistant materials, e.g., high-nickel alloys such as Hastelloy C-276. To promote increased mass and heat transfer between the gaseous products and the aqueous acid solution directed into a gas-fluid contactor, it is possible, as stated above, to include packing in the contactor, particularly in the lower portion. By way of example, for a contactor having an internal diameter of 80 mm, Raschig rings about 6 mm long, with a 4 mm internal diameter and a wall thickness of 1 mm, are generally suitable.

At this initial stage of sol-gel body heat treatment, an aqueous acid solution from a reservoir 20 is sprayed by spray nozzle 28 into the contactor 18. Upon contact with the gaseous products from the dehydroxylation reactor 10, the acid causes formation of organic salts, e.g.,

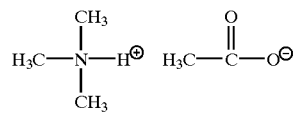

is formed from TRIMA and acetic acid. A variety of acids are capable of being used for the acid solution. Suitable acids generally have a $pK_a$ less than or equal to the $pK_a$ of acetic acid, and typical acids include acetic, citric, and sulfuric. (The acidic solution acts to depress the vapor pressure of TRIMA due to formation of the salt, but it is also possible to just use water. However, the TRIMA will saturate the water, resulting in a higher level of gaseous TRIMA going to the thermal oxidizer, carbon bed absorber, or other waste treatment apparatus.) During the circulation of the aqueous acid solution, the valve 2 leading to a caustic scrubber is closed, and the valves 3 and 4 controlling introduction of dry nitrogen gas and water, respectively, into the contactor 18, are closed to the nitrogen and water supply. A 3-way valve 6 is closed leading to a residue holding tank 22, but is, however, open to reservoir 20.

The resultant organic salt solution, along with unreacted acid and other absorbed organics, non-condensed organic vapors or gases, and noncondensed carrier gases, pass from the contactor 18 through an open valve 1 into the reservoir 20. This organic salt solution/aqueous acid solution in the reservoir 20 is recirculated through a second connection 26, e.g., through piping by use of a pump, back through the spray nozzle 28 and into the gas-fluid contactor 18, to continue trapping the gaseous products from the dehydroxylation reactor 10. Aqueous acid is added to the reservoir 20 as needed to maintain a sufficient concentration to perform this trapping function. As the concentration of organic salts in the reservoir's 20 solution rises to undesirable levels, it is possible to draw portions of the solution from the loop as necessary, e.g., to a thermal oxidizer or other waste treatment. Typically, vapors present in the reservoir 20 e.g., vapor phase TRIMA, carbon monoxide, and methanol, are also send to a thermal oxidizer for disposal.

As the initial stage of the sol-gel heat treatment nears completion, i.e., as the organics are substantially burned out of the sol-gel bodies, the recirculation of the solution from reservoir 20 is halted, and water is directed (through a valve 4) through the spray nozzle 28 of the contactor 18, e.g., for 1 to 5 minutes. The water is used to flush organic residues remaining in the contactor 18 into the reservoir 20. Otherwise, remaining organics would form unwanted chlorinated organics upon subsequent contact with chlorine gas or thionyl chloride gas. This flushing step is then halted and dry nitrogen gas (through a valve 3) is directed through the spray nozzle 28 and into the contactor 18. (Other inert gases are also possible.) The dry nitrogen gas mixes with hot gases from the reactor 10, which are largely free of condensable components at this stage of the heat treatment. This mix of dry nitrogen and hot reactor gases dries the interior of the contactor and valves directly attached to the contactor (and is vented through valve 6 into reservoir 20). Otherwise, any remaining water, in combination with chlorine-containing gases subsequently emitted from the dehydroxylation reactor 10, would tend to cause severe corrosion of metallic components.

During the next stage in the sol-gel heat treatment, chlorine-containing gases, e.g., $Cl_2$ and $SOCl_2$, are used to dehydroxylate the sol-gel bodies and remove metallic and oxide contaminants. A nitrogen (or other inert gas) flow to the gas-fluid contactor is maintained throughout this stage, and for the remainder of the sol-gel heat treatment. It is possible for this gas to be provided from the same source used for drying the contactor 18 or from a different source. This nitrogen flow (a) acts as a diffusion barrier inhibiting backstreaming of water vapor from the caustic scrubber (which would lead to corrosion or interference with sol-gel body treatment), and (b) cools the contactor 18 such that condensable metal salts and sulfur chloride byproducts will be held up in the contactor 18 and will not, therefore, plug up downstream tubing or piping. To assist in holding up such condensable salts, it is possible to include packing in the contactor 18, particularly in the upper portion. The nitrogen gas also assists in cooling the valves and other equipment, thereby allowing the use of relatively low-temperature materials such as polytetrafluoroethylene TEFLON® (which has an upper temperature limit of about 200° C.), e.g., as seals between the contactor 18 and its upper and lower pipe flanges. At this stage in the heat treatment, gases emitted from the dehydroxylation reactor 10, e.g., $Cl_2$ and $SOCl_2$, pass into the contactor 18.

When the heat treatment ends, the sol-gel bodies are removed from the dehydroxylation reactor 10. Water is then directed through the valve 4 into the contactor 18, and through valve 6 into holding tank 22, to flush water soluble salts, e.g., metal salts and sulfur chlorides, into the holding tank for subsequent disposal, i.e., the holding tank is periodically dumped into a caustic scrubbing solution. The process cycle is then repeated for the next group of sol-gel bodies.

The connections, valves, and related equipment are typically formed from corrosion-resistant materials such as stainless steel, e.g., T316L, quartz, and/or polytetrafluoroethylene TEFLON®. Metallic components located adjacent to the contactor, e.g., associated with valves 1, 2, and 5, are typically formed from a highly corrosion-resistant alloy, such as HASTELLOY® C-276 alloy or other high-nickel alloys.

Figure 2:
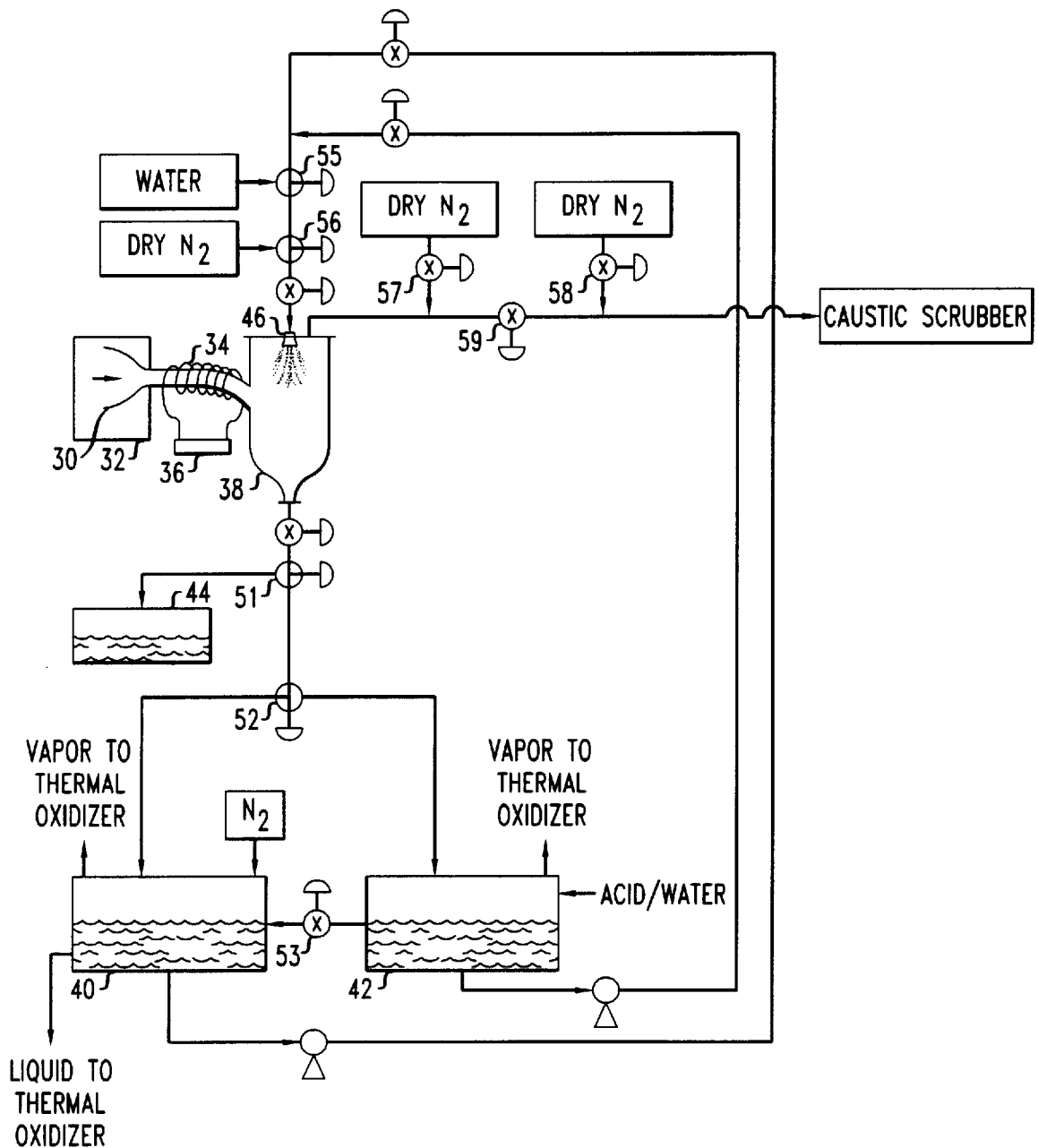
FIG. 2 is a schematic illustration of another apparatus suitable for practicing the invention.

FIG. 2 illustrates another apparatus suitable for practicing the process of the invention, this apparatus being particularly useful for more than one dehydroxylation reactor. Specifically, the two holding tanks 40, 42 allow sufficient flexibility to deal with the needs of several or many reactors at different stages of treatment. Gaseous products from a dehydroxylation reactor 30 located within a furnace 32 are passed into a gas-fluid contactor 38, in this case a spray condenser, through an entrance tube 34. The entrance tube 34 is provided with a heater 36 to prevent condensation within the tube 34. During the initial stages of sol-gel heat treatment, TRIMA vapor, along with carbon monoxide and methanol from thermal decomposition of tetramethylammonium formate, tends to be generated earlier, i.e., at a lower temperature, than HMWO. During this early period of emission, an aqueous acid solution from a first reservoir 40 is directed through a spray nozzle 46 into the contactor 38. Upon contact with the gaseous products from the dehydroxylation reactor 30, the acid results in formation of organic salts, as discussed previously. During the circulation of the aqueous acid solution, the valve 59 leading to a caustic scrubber is closed, and the valves 55 and 56 block introduction of water and dry nitrogen gas, respectively, into the contactor 38. A valve 51 also blocks flow to a residue holding tank 44, and dry nitrogen gas is passed through valve 57 as a purge to keep that section of tubing dry. As in the previous embodiment, it is possible to include packing or other internal materials in the contactor 38.

The resultant TRIMA salt, and unreacted acid, pass from the contactor 38 through a first connection (and through a valve 52) into the first reservoir 40. This TRIMA salt solution/aqueous acid solution in the first reservoir 40 is recirculated, e.g., by use of a pump, through a second connection back into the gas-fluid contactor 38 to continue trapping the TRIMA vapors from the dehydroxylation reactor 30. Typically, a nitrogen blanket is provided in the first reservoir, to reduce the risk of an explosion of flammable TRIMA vapors. Specifically, the concentration of oxygen gas in the head space of the first reservoir is kept below an oxygen concentration that would constitute an explosion hazard with CO, TRIMA, and methanol and other organics in the vapor phase, e.g., below 3.5 vol. % oxygen.

As the concentration of volatile organic vapors generated within the dehydroxylation reactor 30 drops, e.g., as the temperature of the furnace 32 containing the dehydroxylation reactor 30 rises, the concentration of oxygen gas in contact with flammable organic vapors can safely rise, e.g., to 21 vol. %. Specifically, for process safety reasons, when the concentration of organic vapors in the gases exiting the dehydroxylation reactor 30 are below 50% of the lower explosion limit (LEL) of the mixture, the oxygen content is allowed to increase, e.g., as high as 21 vol. %. Then, the circulation of solution from the first reservoir 40 is ceased, and circulation of an aqueous acid solution from a second reservoir 42 into the contactor 38 is initiated. This secondary aqueous acid solution performs the same trapping function discussed previously, and the dissolved organics, aqueous acid, and reactor gases are directed through the valve 52 back into the second reservoir 42 for recirculation.

The second reservoir 42 is provided with an overflow valve 53, such that solution from the second reservoir overflows into the first reservoir. During both the TRIMA and the subsequent organic vapor trapping steps, aqueous acid is added to the second reservoir as needed to maintain a sufficient concentration. Portions of the solution from the first reservoir 40 are drawn off as necessary, e.g., to send to a thermal oxidizer or other waste treatment as the concentration of organic salts rises to undesirable levels. In addition, the vapor head from both the first and second reservoirs 40, 42 is typically sent to a thermal oxidizer for disposal.

After the organic burnout stage of the sol-gel heat treatment is completed, the recirculation of the solution from the second reservoir 42 is halted. Water is directed (through a valve 55) to the spray nozzle 46 of the contactor 38 to clean the contactor 38 of organic residues which were not carried into the first or second reservoirs 40, 42. The water and residue is flushed through the contactor 38 and through valves 51 and 52 into reservoir 42. This cleaning step is then halted and dry nitrogen gas (or another inert gas) is directed through a valve 56 into the contactor 38. As discussed previously, the dry nitrogen gas is used to dry the contactor and valves directly connected to the contactor, in order to prevent corrosion.

At the next stage in the sol-gel heat treatment, chlorine-containing gases, e.g., $Cl_2$ and $SOCl_2$, are used to dehydroxylate the sol-gel bodies, and a nitrogen flow is maintained for the remainder of the sol-gel treatment. As discussed previously, this nitrogen flow (a) acts as a diffusion barrier to the backstreaming of water vapor from the caustic scrubber, (b) cools the contactor 38 to keep condensable metal salts in the contactor 38, and (c) cools the valves and associated equipment, thereby allowing the use of relatively low-temperature materials such as polytetrafluoroethylene TEFLON®. Gases emitted from the dehydroxylation reactor 30 pass into the contactor 38. Metal chlorides are largely trapped in the contactor 38, and non-condensing gases, e.g., air, nitrogen, chlorine, and thionyl chloride, are sent to the caustic scrubber. Valve 57 is open only during the organic burnout to allow dry nitrogen gas to pass into the piping and into the contactor with valve 59 closed to keep that section of tubing dry. When valve 59 opens, valve 57 closes. Valve 58 is open the entire time to keep the tubing leading up to the caustic scrubber dry and to reduce backstreaming of wet gases from the caustic scrubber into the contactor outlet tubing.

When the heat treatment ends, and after the gel bodies are removed from the reactor, water is directed through the valve 55 into the contactor 38, to flush water soluble materials, e.g., metal salts and sulfur chlorides, into the holding tank 44. The entire process cycle is then repeated for subsequent sets of sol-gel bodies.

As discussed in U.S. Pat. No. 5,240,488, where the sol-gel bodies are intended for overcladding tubes, after dehydroxylation the bodies are into the final tubes. Once the overcladding tube is prepared, it is typically combined with a core rod, and the combination is collapsed together to form the final glass preform, as discussed in U.S. Pat. No. 4,775,401, the disclosure of which is hereby incorporated by reference. It is possible to form the core rod by a variety of methods, including modified chemical vapor deposition (MCVD), outside vapor deposition (OVD), vapor axial deposition (VAD). The MCVD process is discussed in U.S. Pat. Nos. 4,217,027; 4,262,035; and 4,909,816, the disclosures of which are hereby incorporated by reference. The preform is then drawn into fiber by standard methods known to one skilled in the art, such as discussed in F. DiMarcello et al. "Fiber Drawing and Strength Properties," *Optical Fiber Communications,* Vol. 1, Academic Press, Inc., 1995, at 179–248, the disclosure of which is hereby incorporated by reference.

Other embodiments of the invention will be apparent to those skilled in the art from consideration of the specification and practice of the invention disclosed herein.

What is claimed is:

1. A process, comprising the sequential steps of:
    passing first gaseous products comprising organic compounds into a gas-fluid contactor through an entrance tube, directing a solution comprising water or water and acid into the gas-fluid contactor to treat the products, and passing the solution and treated products through the contactor into a reservoir;
    halting the flow of the solution into the contactor;
    performing a first flush of the gas-fluid contactor with water;
    drying the gas-fluid contactor with a first gas;
    passing second gaseous products comprising at least one chlorine-containing gas into the gas-fluid contactor through the entrance tube, and passing at least a portion of the second gaseous products from the contactor into a caustic scrubber while maintaining a flow of second gas into the contactor, the second gas being the same as or different from the first gas; and
    performing a second flush of the gas-fluid contactor with water.

2. The process of claim 1, wherein the entrance tube is heated to at least 325° C. while the first and the second gaseous products are passed through the entrance tube.

3. The process of claim 1, wherein the first and second gases are dry nitrogen.

4. The process of claim 1, wherein the acid has a $pK_a$ equal to or less than the $pK_a$ of acetic acid.

5. The process of claim 1, wherein the solution is directed into the contactor by a spray nozzle.

6. The process of claim 1, further comprising a step of directing at least a portion of the solution comprising treated products into a thermal oxidizer.

7. The process of claim 1, further comprising a step of directing vapor from the reservoir into a thermal oxidizer.

8. The process of claim 1, wherein the material resulting from the second flushing step is flushed into a holding tank.

9. An apparatus for treating by-products of a fabricating process, comprising:
    a gas-fluid contactor comprising an entrance tube, the tube capable of being heated to at least 150° C.;
    a reservoir comprising a solution that comprises water, or water and acid;
    a first connection that directs material from the contactor into the reservoir and a second connection that directs solution from the reservoir to the contactor;
    a source of gas connected to the contactor;
    a source of water connected to the contactor;
    a caustic scrubber connected to the contactor by a third connection.

10. The apparatus of claim 9, wherein the gas is dry nitrogen.

11. The apparatus of claim 10, wherein the dry nitrogen gas and the water source are connected to the second connection.

12. The apparatus of claim 9, wherein the gas-fluid contactor comprises a spray nozzle.

13. The apparatus of claim 12, wherein the contactor further comprises packing.

14. The apparatus of claim 13, wherein the packing comprises Raschig rings.

15. The apparatus of claim 9, wherein the contactor is formed from a material selected from quartz and high-nickel corrosion-resistant alloys.

16. The apparatus of claim 9, wherein the second connection comprises at least one pump to direct the solution to the contactor.

17. The apparatus of claim 9, wherein the entrance tube is heated by a surrounding furnace or by wrapping of resistive heating wire or tape.

18. The apparatus of claim 9, wherein a connection between the entrance tube and a dehydroxylation reactor comprises two quartz ball and socket joints attached to opposing ends of a length of tubing.

* * * * *